United States Patent
Brown et al.

(10) Patent No.: US 7,712,018 B2
(45) Date of Patent: May 4, 2010

(54) SELECTING AND FORMATTING WARPED TEXT

(75) Inventors: Sara Melanie Brown, Palo Alto, CA (US); Dachuan Zhang, Sunnyvale, CA (US); Jonathan Patrick Schoeller, Mountain View, CA (US); Michael John Arvold, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1094 days.

(21) Appl. No.: 11/302,001

(22) Filed: Dec. 12, 2005

(65) Prior Publication Data

US 2007/0136664 A1 Jun. 14, 2007

(51) Int. Cl.
*G06F 17/00* (2006.01)

(52) U.S. Cl. ...................... 715/204; 715/256

(58) Field of Classification Search ............... 715/222, 715/204, 256, 269, 243
See application file for complete search history.

(56) References Cited

U.S. PATENT DOCUMENTS

| | | | | |
|---|---|---|---|---|
| 5,182,709 A * | 1/1993 | Makus | ............................ | 704/9 |
| 5,416,898 A * | 5/1995 | Opstad et al. | ................ | 345/468 |
| 5,649,216 A | 7/1997 | Sieber | .......................... | 395/767 |
| 5,666,503 A * | 9/1997 | Campanelli et al. | .......... | 715/853 |
| 5,990,941 A | 11/1999 | Jackson et al. | ............... | 348/207 |
| 6,002,853 A * | 12/1999 | de Hond | ...................... | 709/219 |
| 6,084,598 A * | 7/2000 | Chekerylla | ................... | 345/441 |
| 6,278,455 B1 * | 8/2001 | Baker | ........................... | 715/716 |
| 6,279,017 B1 * | 8/2001 | Walker | .......................... | 715/201 |
| 6,640,010 B2 | 10/2003 | Seeger et al. | ................. | 382/229 |
| 6,734,851 B2 | 5/2004 | Georgiev | ..................... | 345/419 |
| 6,781,606 B2 * | 8/2004 | Jouppi | ......................... | 345/698 |
| 6,803,913 B1 * | 10/2004 | Fushiki et al. | ............... | 345/467 |
| 6,868,524 B1 | 3/2005 | Fushiki et al. | ............... | 715/529 |
| 7,098,932 B2 * | 8/2006 | Georgiev et al. | ............. | 345/647 |
| 7,278,117 B2 * | 10/2007 | Gargi | .......................... | 715/864 |
| 7,287,220 B2 * | 10/2007 | Kaasila et al. | ............... | 715/201 |
| 2002/0085046 A1 * | 7/2002 | Furuta et al. | ................. | 345/848 |
| 2002/0103834 A1 * | 8/2002 | Thompson et al. | ........... | 707/526 |
| 2003/0215776 A1 * | 11/2003 | Chesters | ...................... | 434/183 |
| 2004/0001634 A1 * | 1/2004 | Mehrotra | ..................... | 382/232 |
| 2005/0096980 A1 | 5/2005 | Koningstein | .................. | 705/14 |
| 2006/0036950 A1 * | 2/2006 | Himberger et al. | ........... | 715/732 |
| 2006/0041848 A1 * | 2/2006 | Lira | ............................ | 715/805 |
| 2007/0234231 A1 * | 10/2007 | Lee | .............................. | 715/788 |

OTHER PUBLICATIONS

Adobe Illustrator; http://www.adobe.com/products/illustrator/overview2.html; 7 pgs.
Adobe Photoshop; http://www.adobe.com/products/photoshop/overview2.html; 6 pgs.
Digital Imaging—Photoshop: Support Working with Text; http://www.hypermedia7.ie/tutorials/photoshop/text.htm.

* cited by examiner

*Primary Examiner*—Laurie Ries
(74) *Attorney, Agent, or Firm*—Merchant & Gould; Ryan T. Grace (57) ABSTRACT

Selecting and formatting warped text is disclosed. Text effects such as an underline effect and/or a strikethrough effect may be transformed along with rectangular text to form a warped text element. In such a situation, the text effects are warped with the characters of the text. Also, warped text may be accurately selected or "hit." The coordinates of a selection of warped text are inversely transformed to map the selection to the rectangular text. The inverse transform provides an accurate manner to determine the scope and location of the selection. When the scope and location are determined, the graphical representation of the selection may be transformed to provide a user with an accurate representation of a warped selection.

20 Claims, 6 Drawing Sheets

SELECTING AND FORMATTING WARPED TEXT

BACKGROUND

Warping text is one manner for displaying text. Generally, characters are transformed to a warped orientation. Warping text applies to characters of the text. There is no manner for warping text effects, which makes warping undesirable in many situations. Moreover, selecting and or modifying warped text is inefficient and inaccurate. Such inefficiency and inaccuracy occurs because selection of a warped element does not take into account that the element is warped. Therefore, the user may make a selection based on the visual orientation of the warped element; however, the selection may map to a different portion of the element.

SUMMARY

This Summary is provided to introduce a selection of concepts in a simplified form that are further described below in the Detailed Description. This Summary is not intended to identify key features or essential features of the claimed subject matter. Also, this Summary is not intended for use as an aid in determining the scope of the claimed subject matter.

Aspects of the disclosure include selecting and formatting warped text. Text effects such as an underline effect and/or a strikethrough effect may be transformed along with rectangular text to form a warped text element. In such a situation, the text effects are warped with the characters of the text. Also, warped text may be accurately selected or "hit." When a selection is made, a pointer's coordinates in the warped text are inversely transformed to map the selection to the rectangular text. The inverse transform provides an accurate manner to determine the scope and location of the selection. When the scope and location are determined, the graphical representation of the selection may be transformed to provide a user with an accurate representation of the location of the selection.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments of the present invention described herein are referred to alternatively as operations, steps or modules.

Illustrative Embodiments for Selecting and Formatting Warped Text

Aspects of the disclosure include selecting and formatting warped text. As one aspect of the disclosure, text effects such as an underline effect and/or a strikethrough effect may be transformed along with rectangular text to form a warped text element. In such a situation, the text effects are warped with the characters of the text.

In other aspects of the disclosure, warped text may be accurately selected or "hit." Aspects may also include associating one or more effects to the selection. When a selection is made, the pointer's coordinates in the warped text are inversely transformed to map the selection to the rectangular text. The inverse transform provides an accurate manner to determine the scope and location of the selection. When the scope and location are determined, the graphical representation of the selection may be transformed to provide a user with an accurate representation of the location of the selection.

As is more fully set forth herein, aspects of the disclosure provide a manner for warping text effects and for accurately applying text effects to warped text. Aspects also include providing accurate selection or hitting of text that is warped.

Figure 2:
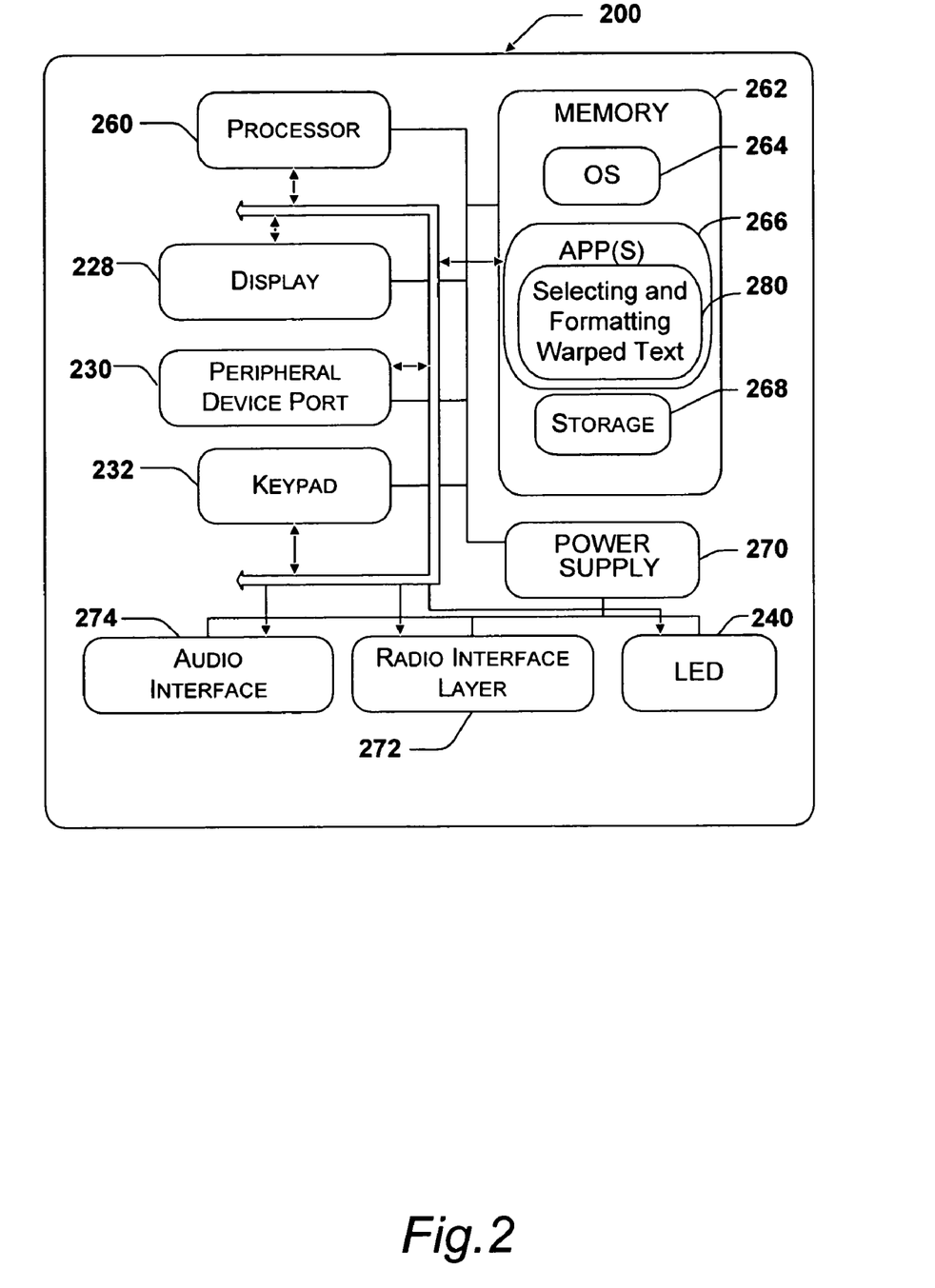
FIG. 2 illustrates an exemplary mobile device that may be used in one aspect of the present invention.
Figure 3:
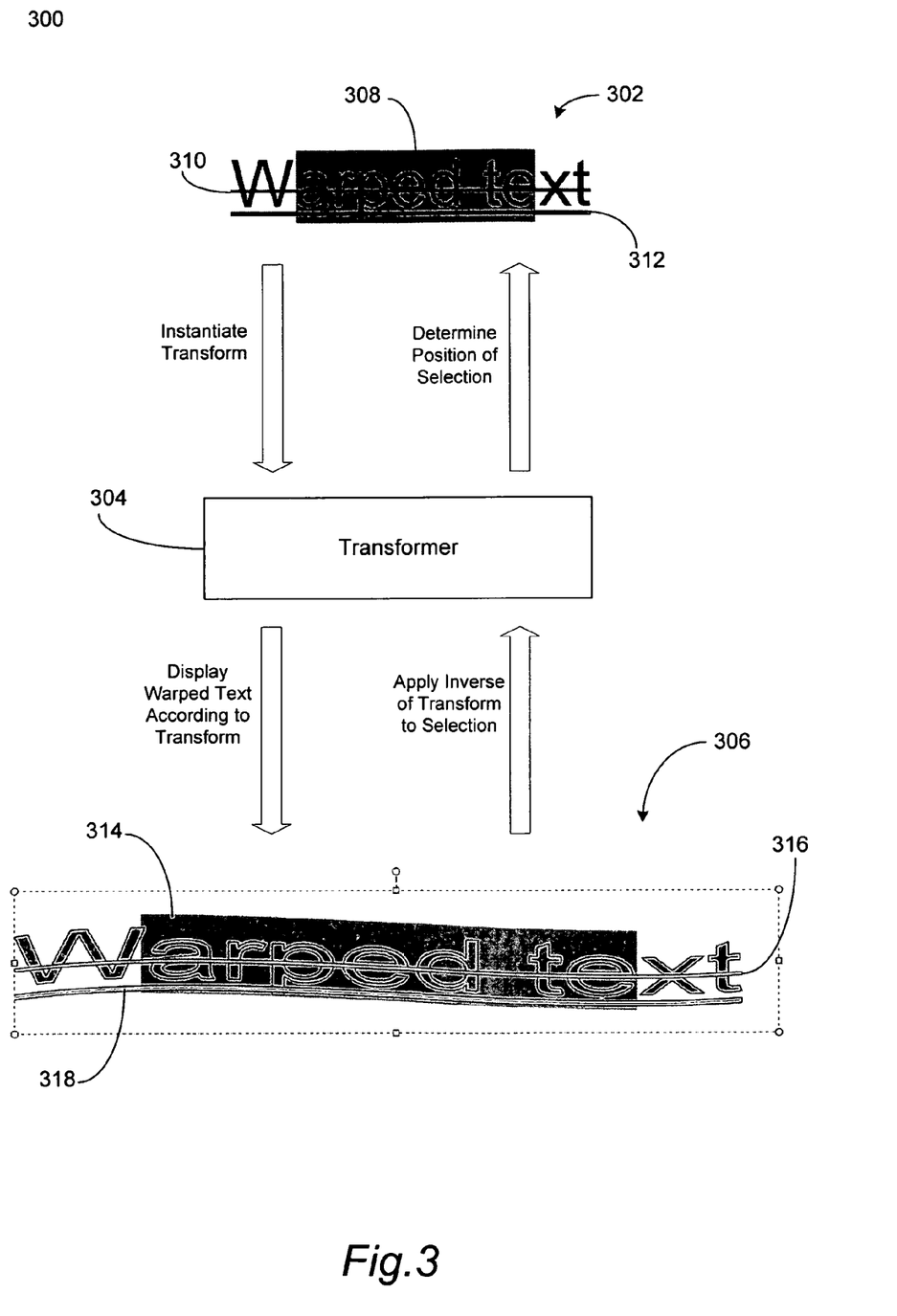
FIG. 3 represents one exemplary system overview for selecting and formatting warped text.

FIG. 3 represents one exemplary system overview 300 for selecting and formatting warped text. Rectangular text element 302, transformer 304, and warped text element 306 represent a general modular overview of some aspects of the disclosure. Rectangular text element 302, transformer 304, and warped text element 306 may be integrated as a combination of software and hardware elements, an operating system or any combination thereof. Hardware, databases, software or applications referenced herein may be integrated as a single element or include various elements in communication with one another. Software and/or hardware elements are depicted herein for explanatory purposes only and not for limiting the configuration to multiple elements or a single element performing several functions. Elements of rectangular text element 302, transformer 304 and warped text element 306 may reside on a single computing device or a plurality of computing devices in communication with one another. Aspects of rectangular text element 302, transformer 304 and warped text element 306 may be associated with computing device 100 as exemplified in FIG. 1 and/or mobile computing device 200 as exemplified in FIG. 2. However, FIG. 3 is but one exemplary system and not meant for limiting the functionality disclosed herein to a particular device, a single device or a plurality of devices.

In FIG. 3, system 300 may include rectangular text element 302. Rectangular text element 302 may include any type of text element associated with a rectangular layout. For example, in one aspect, rectangular text element 302 may be associated with MICROSOFT WORD of MICROSOFT CORPORATION headquartered in Redmond, Wash. In another aspect, rectangular text element 302 may be associated with MICROSOFT EXCEL of MICROSOFT CORPORATION headquartered in Redmond, Wash. As yet another example, rectangular text element 302 may be associated with MICROSOFT POWERPOINT of MICROSOFT CORPORATION headquartered in Redmond, Wash. As still another example, rectangular text element 302 may be associated with MICROSOFT WORD ART of MICROSOFT CORPORATION headquartered in Redmond, Wash. In general, rectangular text element 302 may include and/or be associated with any type of program that includes text entry.

In other aspects, rectangular text element 302, may include text effects. For example, rectangular text element 302 may include selection 308. As another example, rectangular text element 302 may include strikethrough 310. In still another example, rectangular text element 302 may include underline 312. In general, rectangular text element 302 may include text and text effects generated in a rectangular coordinate system.

System 300 may include transformer 304. Transformer 304 may include a transformer for transforming a rectangular text element into a warped text element. Transformer 304 may be associated with a transform algorithm that transforms data associated with the graphical representation of rectangular text elements into warped text elements. Transformer 304 may include a plurality of transform algorithms that cause rectangular text elements to be transformed into one or more warped representations of the rectangular text elements.

Warped text element 306 may include warped text and effects that are associated with rectangular text element 302 via transformer 304. For example, warped text element 306 may include warped selection 314. Warped selection 314 may be associated with selection 308 via transformer 304. Warped selection 314 may include a warped representation of selection 308. As another example, warped text element 306 may include warped strikethrough 316. Warped strikethrough 316 may be associated with strikethrough 310 via transformer 304. Warped strikethrough 316 may include a warped representation of strikethrough 310. As still another example, warped text element 306 may include warped underline 318. Warped underline 318 may be associated with underline 312 via transformer 304. Warped underline 318 may include a warped representation of underline 312.

In general and as one example of the functionality of elements of the disclosure, a user may obtain a text element. The text element may include one or more characters along with one or more text effects. When it is decided to warp the text element, a transformer is instantiated to transform the text element according to one or more transform algorithms. The transform algorithm is applied to the layout of the text element to generate a warped text element.

When a warped text element has been generated, a user may desire selecting and/or modifying the warped text element. As one example, a user may select a point between two warped characters to add more characters. In such a situation, a user may click a mouse button to insert a cursor between the two warped characters. In another example, a user may select a group of warped characters to add one or more text effects. In such a situation, the inverse of the transform algorithm is applied to the coordinates of the pointer. The coordinates of the selection is determined in association with the rectangular text element. Once the position of the selection is determined, the transform algorithm is instantiated to transform the selection in accordance with the transform algorithm and display the warped text with a warped selection determined by the transformed coordinates. In this manner, text effects may be warped along with characters and the coordinates of a selection or hit on the warped text may be accurately displayed to a user.

Figure 4:
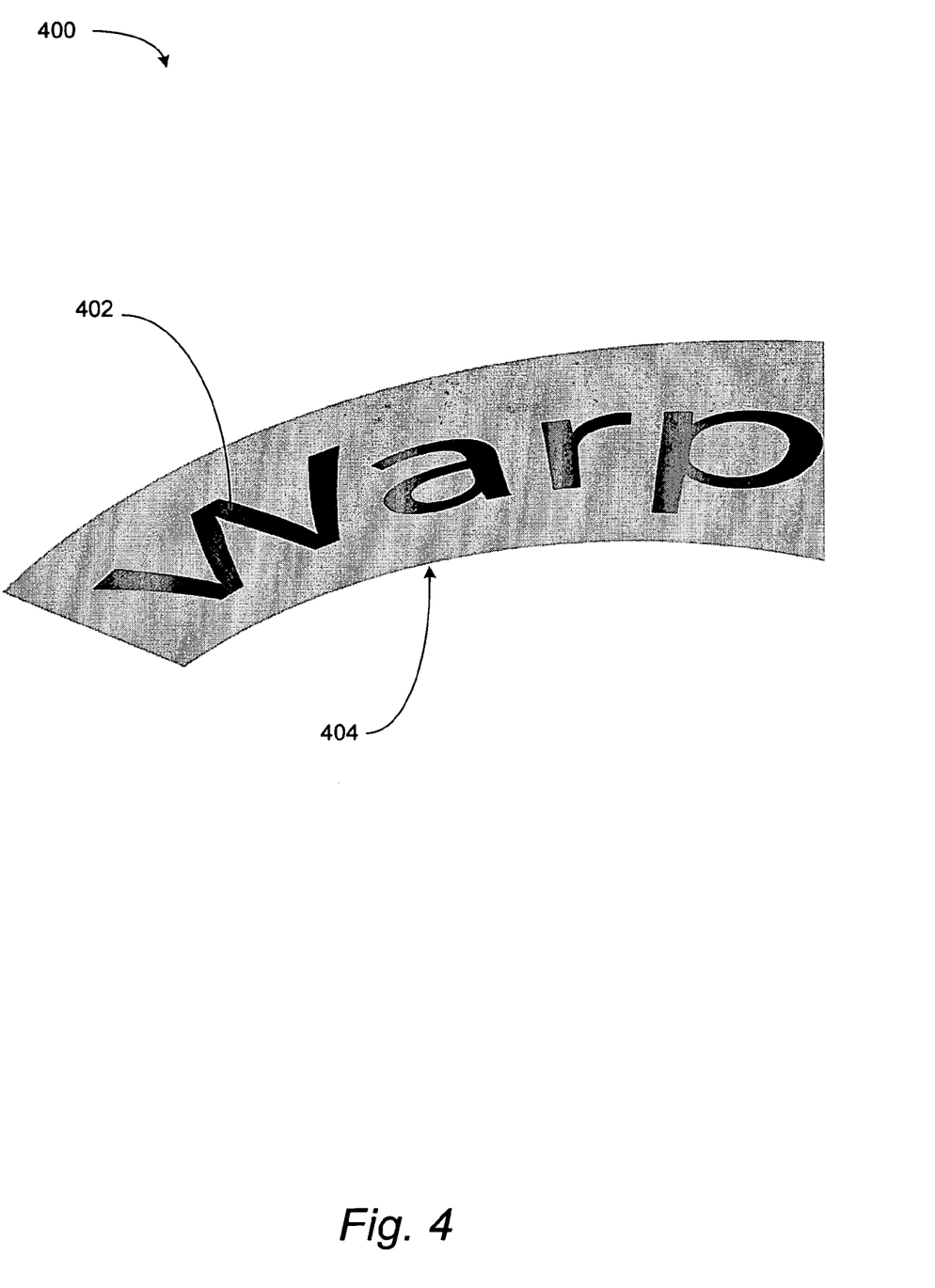
FIG. 4 represents one exemplary warped text element associated with one aspect of selecting and formatting warped text.

FIG. 4 represents one exemplary warped text element 400. Warped text element 400 may include warped text 402. Warped text 402 may include text elements after a transform algorithm has been applied to rectangular text elements. For example, in FIG. 4, warped text 402 includes the word "Warp". Warped text element 400 may also include a warped selection 404. As an example in FIG. 4, warped selection 404 is represented by the shaded area. In one aspect, warped selection 404 is associated with the same transform algorithm as warped text 402.

Figure 5:
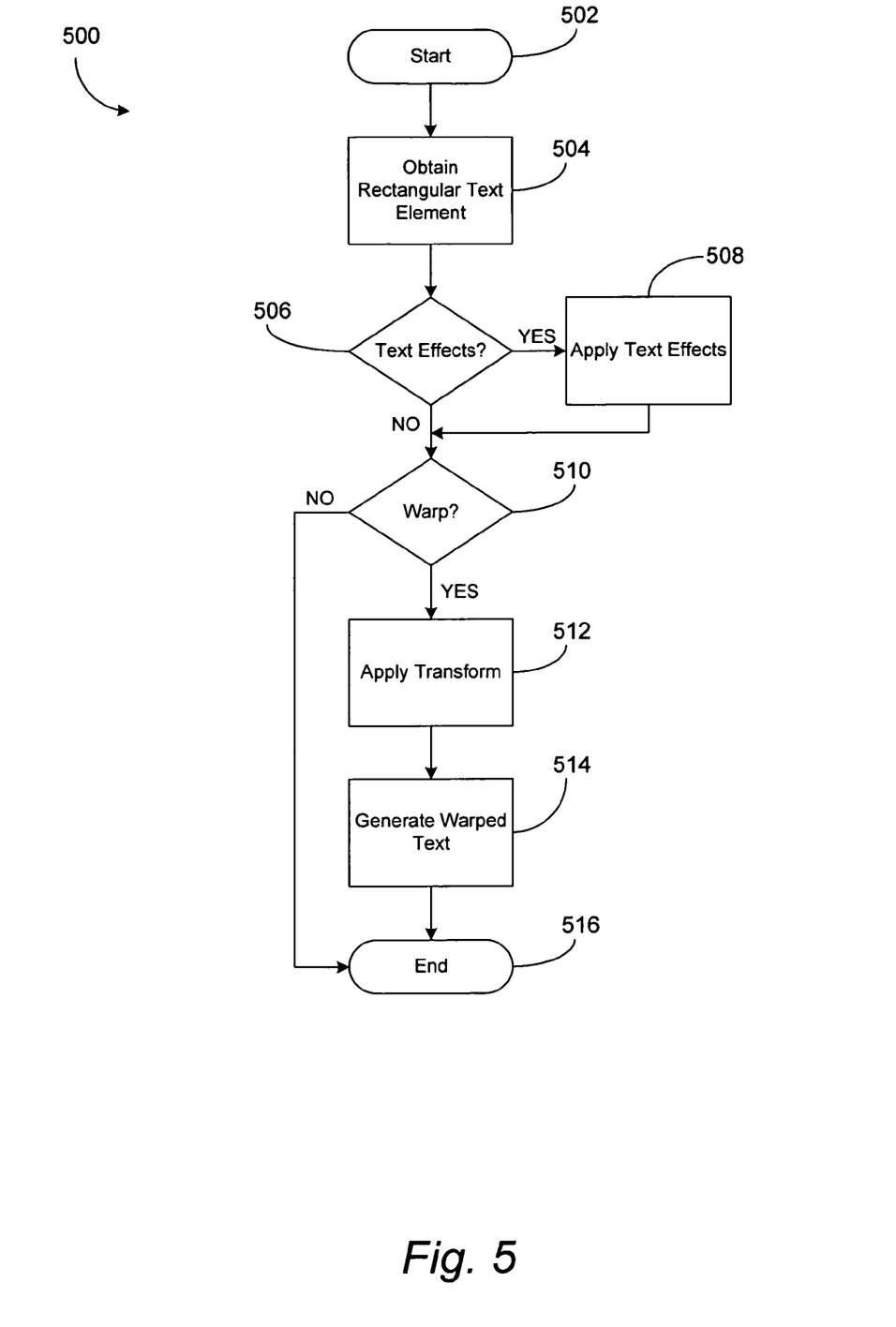
FIG. 5 is an operational flow diagram representing an exemplary embodiment for warping a rectangular text element.

FIG. 5 is an operational flow diagram representing an exemplary embodiment for warping a rectangular text element. Operational flow 500 begins at start operation 502 and continues to operation 504. Operation 504 includes obtaining a rectangular text element. A rectangular text element may include a character, letter, number, word, symbol, graph, picture, and/or any other means of representational display. In one aspect, a rectangular text element includes a linear orientation. In another aspect, a rectangular text element includes a linear orientation in a rectangular coordinate system.

Operational flow 500 continues to decision operation 506. At decision operation 506, it is determined whether the obtained rectangular text element is associated with text effects. In one aspect, a text effect may include a selection block, an underline, and/or a strikethrough. The text effect may be pre-associated with the rectangular text element or the text effect may include a user input to apply the text effect. Where text effects are associated, operational flow 500 continues to operation 508. At operation 508, text effects are applied to the rectangular text element and operational flow loops back as depicted in FIG. 5.

In the situation where text effects are not associated with the obtained rectangular text element, operational flow 500 continues from decision operation 506 to decision operation 510. At decision operation 510, it is decided whether to warp the rectangular text element. Such a decision may include a user decision, a preset configuration, an automatic decision, a decision upon user input, or any other manner of making a decision in a computing environment. When it is decided not to warp the rectangular text element, operational flow 500 continues to end operation 516.

When it is decided to warp the rectangular text element, operational flow 500 continues from decision operation 510 to operation 512. At operation 512 a transform is applied to the rectangular text element. The transform may include a transform algorithm that transforms the rectangular text element into a warped text element. The transform may include an algorithm for modifying, transforming and/or warping the linear orientation of the rectangular text element to a warped orientation. In general, the transform may include any type of transform for transforming a rectangular text element to a warped representation.

Operational flow 500 continues to operation 514 where the warped text is generated. In one aspect, the warped text is displayed to a user. The warped text element may also include a shape selection box associated with the warped text element when a user selects the warped text element. The warped text may also include a text selection box associated with the warped text element when the user selects the text of the warped text element. The warped text selection box may indicate the shape of the warp. Operational flow 500 continues to end operation 516.

Figure 6:
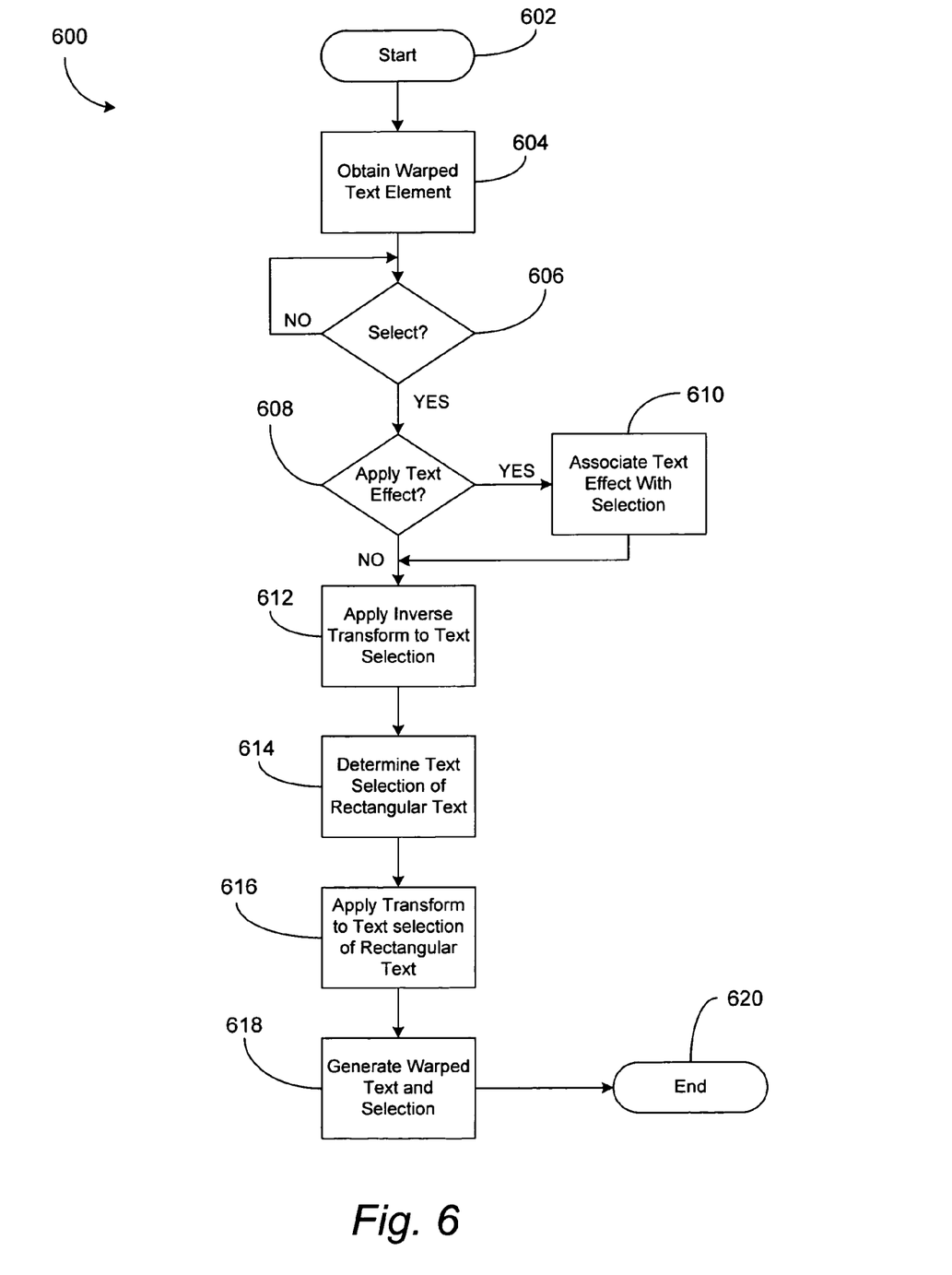
FIG. 6 is an operational flow diagram representing an exemplary embodiment for selecting and formatting warped text.

FIG. 6 is an operational flow diagram representing an exemplary embodiment for selecting and formatting warped text. Operational flow 600 begins at start operation 602 and continues to operation 604, where a warped text element is obtained. In one aspect, a warped text element is obtained through user generation of the warped text element. In another aspect, the warped text element may be pre-generated.

Operational flow 600 continues to decision operation 608. At decision operation 608 it is decided whether a selection has occurred. A selection may include a user selecting the warped text element or a portion of the warped text element. The selection may be associated with the X and Y coordinates of a pointer. As an example, a user may use a mouse to hover a cursor to an area to input (hit) the cursor in the warped text element. The user may click the mouse to insert the cursor at a specific point. In another situation, the user may select a portion of the warped text element by dragging the cursor over a portion of the warped text element. In such a situation, a selection block is generated over the selected portion. Even though a mouse is described herein, a user may also use a keyboard, joystick, input stick, pad or any other type of input device to make a selection. If a selection does not take place, operational flow 600 loops back as indicated in FIG. 6.

When a selection has occurred, operational flow 600 continues to decision operation 608. At decision operation 608, it is determined whether to apply a text effect. In one aspect a text effect may include a selection, an underline and/or a strikethrough. In another aspect, the text effect is applied through a user selection. As an example at this stage in operational flow 600, a user may obtain a warped text element. The user may decide to make a selection by inserting the cursor at a point in the warped text element and/or selecting a portion of the warped text element. In one aspect, when a portion of the warped text element is selected a text effect may be instantiated, such as underlining the selected portion.

When text effects are not applied, operational flow 600 continues to 612 as more fully set forth below. When text effects are applied, operational flow 600 continues to operation 610 where the text effect is associated with the selection. Operational flow 600 then continues to operation 612.

At operation 612, an inverse transform is applied to the coordinates of the selection. The inverse transform may include an inverse transform algorithm that associates the selection with the rectangular text element to identify the positioning of the selection. In general, the inverse transform may include any type of transform for determining the location of the user selection in a warped orientation.

Operational flow 600 continues to operation 614. At operation 614, the positioning and/or scope of the selection is determined in the rectangular orientation. In this manner, when the user makes a selection associated with the warped text element, the coordinates of the selection are mapped to the rectangular text element to determine the location of the selection.

At operation 616, the location of the selection is known. The transform is applied to the selection to display the selection in the warped orientation. The transform may include aspects of the transform described above in association with FIG. 5. The transform may also include the same transform as described above in association with FIG. 5.

Operational flow 600 continues to operation 618 where the warped text element having the warped selection is displayed to the user. For example, the warped selection may include aspects of the selection associated with FIG. 4. When text effects are associated with the selection, the warped selection may include aspects of warped text element 306 described above in association with FIG. 3. In one aspect, the warped selection includes a cursor. The cursor may remain a straight vertical line in the warped text stream. The cursor may map to the warped characters and rotate based on the direction of the warp.

As stated herein, aspects of the disclosure allow text effects to be warped along with a rectangular text element. Also aspects provide an accurate manner for determining where a selection and/or hit have occurred within a warped text element. Such an aspect allows a user to accurately select and modify warped text elements once the warped text elements have been generated.

Illustrative Operating Environment

Figure 1:
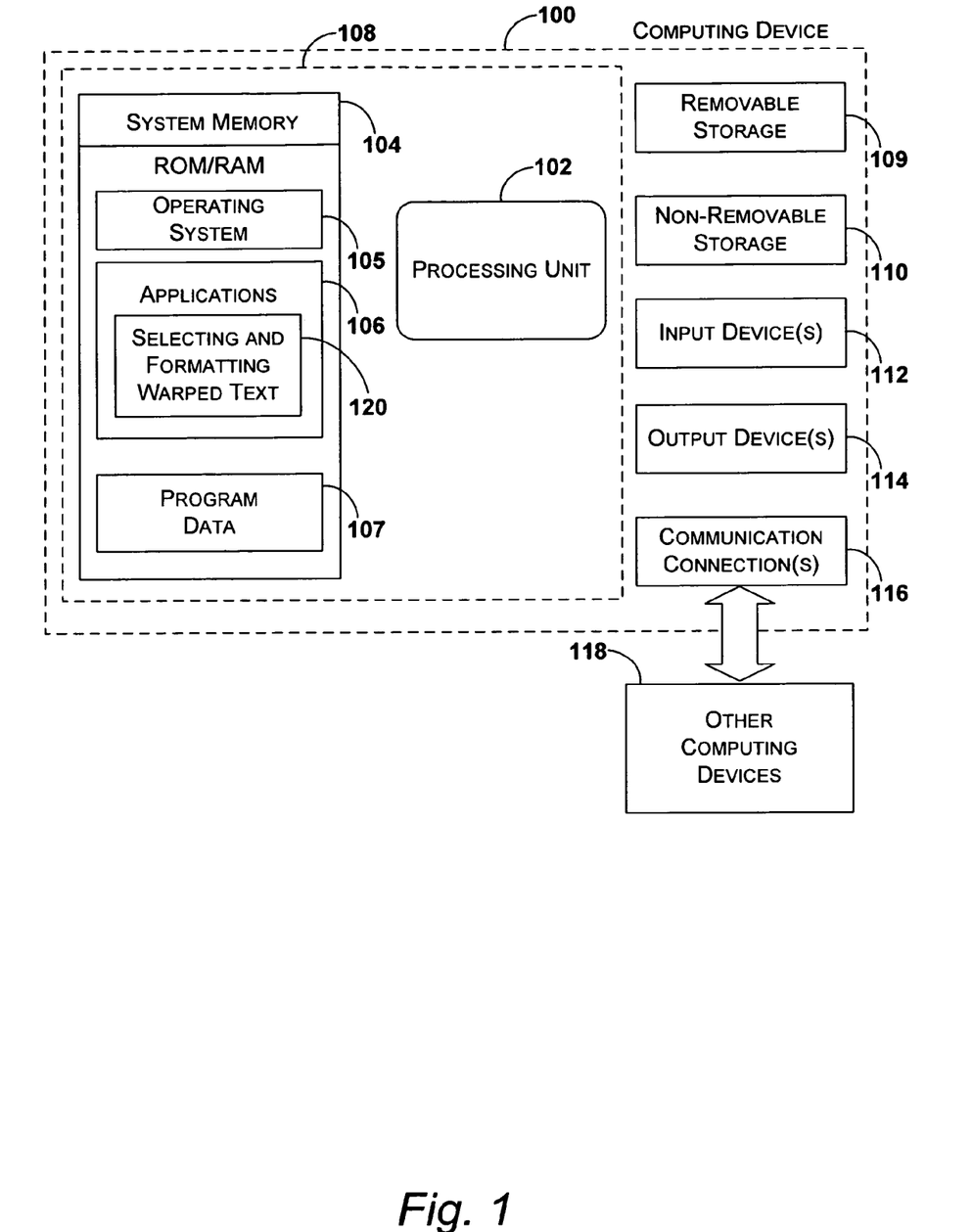
FIG. 1 illustrates an exemplary computing device that may be used in one aspect of the present invention.

Referring to FIG. 1, an exemplary system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes operating system 105, one or more applications 106, and may include program data 107. In one embodiment, applications 106 further include application 120 for selecting and formatting warped text. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as a keyboard, mouse, pen, voice input device, touch input device, etc. Output device(s) 114 such as a display, speakers, printer, etc. may also be included. All these devices are known in the art and need not be discussed at length here.

Computing device 100 also contains communication connection(s) 116 that allow the device to communicate with other computing devices 118, such as over a network or a wireless mesh network. Communication connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device 200 that may be used in one exemplary embodiment of the present invention. With reference to FIG. 2, one exemplary system for implementing the invention includes a mobile computing device, such as mobile computing device 200. The mobile computing device 200 has processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, which is resident in memory 262 and executes on processor 260. Keypad 232 may be a push button numeric dialing pad (such as on a typical telephone), or a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on operating system 264. Examples of application programs include phone dialer programs, e-mail programs, scheduling programs, PIM (personal information management) programs, word processing programs, spreadsheet programs, Internet browser programs, and so forth. Mobile computing device 200 also includes non-volatile storage 268 within memory 262. Non-volatile storage 268 may be used to store persistent information which should not be lost if mobile computing device 200 is powered down. Applications 266 may use and store information in storage 268, such as e-mail or other messages used by an e-mail application, contact information used by a PIM, appointment information used by a scheduling program, documents used by a word processing application, and the like. In one embodiment, applications 266 further include application 280 for selecting and formatting warped text.

Mobile computing device 200 has power supply 270, which may be implemented as one or more batteries. Power supply 270 might further include an external power source, such as an AC adapter or a powered docking cradle that supplements or recharges the batteries.

Mobile computing device 200 is shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes radio interface layer 272 that performs the function of transmitting and receiving communications, such as radio frequency communications. Radio interface layer 272 facilitates wireless connectivity between mobile computing device 200 and the outside world, via a communications carrier or service provider. Transmissions to and from radio interface layer 272 are conducted under control of operating system 264. In other words, communications received by radio interface layer 272 may be disseminated to application programs 266 via operating system 264, and vice versa.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-implemented method for selecting and formatting warped text, the method comprising:
   obtaining a text element having a linear orientation in a document of an application;
   receiving a selection to warp the text element;
   upon receiving the selection to warp the text element, applying a transform algorithm to the text element to cause a computer processor to transform the linear orientation into a warped orientation;
   obtaining a text effect selection of the warped orientation of the text element;
   applying an inverse transform algorithm to the text effect selection of the warped text element, wherein the inverse transform algorithm is an inverse algorithm of the transform algorithm;
   determining a location of the text effect selection in relation to the text element having the linear orientation based on the application of the inverse transform algorithm; and
   after determining the location of the text effect selection in relation to the text element having the linear orientation, applying the transform algorithm to a text effect related to the text effect selection to cause a computer processor to display the text effect at the determined location in the warped orientation of the text element.

2. The computer-implemented method of claim 1, wherein the text element includes at least one member of a group comprising: a character, a letter, a number, a word, a symbol, a graph, and a picture.

3. The computer-implemented method of claim 1, wherein the text effect includes at least one member of a group comprising: a highlight selection, an underline, and a strikethrough.

4. The computer-implemented method of claim 1, wherein the text effect selection relates to a cursor hit on the warped orientation.

5. The computer-implemented method of claim 4, wherein the text effect selection includes a cursor displayed rotated in accordance with the warped orientation.

6. The computer-implemented method of claim 1, wherein the text effect selection relates to a selection highlight block on the warped orientation.

7. The computer-implemented method of claim 6, wherein the selection highlight block is rotated in accordance with the warped orientation.

8. A computer-readable storage medium having computer executable instructions for selecting and formatting warped text, the instructions comprising:
   obtaining a text element having a linear orientation;
   receiving a selection to warp the text element;

upon receiving the selection to warp the text element, applying a transform algorithm to the text element to transform the linear orientation into a warped orientation;

obtaining a text effect selection of the warped orientation of the text element;

applying an inverse transform algorithm to the text effect selection of the warped text element, wherein the inverse transform algorithm is an inverse algorithm of the transform algorithm;

determining a location of the text effect selection in relation to the text element having the linear orientation based on the application of the inverse transform algorithm; and applying the transform algorithm to a text effect related to the text effect selection to display the text effect at the determined location in the warped orientation of the text element.

9. The computer-readable storage medium of claim 8, wherein the text element includes at least one member of a group comprising: a character, a letter, a number, a word, a symbol, a graph, and a picture.

10. The computer-readable storage medium of claim 8, wherein the text effect includes at least one member of a group comprising: a highlight selection, an underline, and a strikethrough.

11. The computer-readable storage medium of claim 8, wherein the text effect selection relates to a cursor hit on the warped orientation.

12. The computer-readable storage medium of claim 11, wherein the text effect selection includes a cursor displayed rotated in accordance with the warped orientation.

13. The computer-readable storage medium of claim 8, wherein the text effect selection relates to a selection highlight block on the warped orientation.

14. The computer-readable storage medium of claim 13, wherein the selection highlight block is rotated in accordance with the warped orientation.

15. A system for selecting and formatting warped text, the instructions comprising:

a processor; and a memory having computer executable instructions stored thereon, wherein the computer-executable instructions are configured for:

obtaining a text element having a linear orientation;

receiving a selection to warp the text element;

upon receiving the selection to warp the text element, applying a transform algorithm to the text element to transform the linear orientation into a warped orientation;

obtaining a text effect selection of the warped orientation of the text element;

applying an inverse transform algorithm to the text effect selection of the warped text element, wherein the inverse transform algorithm is an inverse algorithm of the transform algorithm;

determining a location of the text effect selection in relation to the text element having the linear orientation based on the application of the inverse transform algorithm; and applying the transform algorithm to a text effect related to the text effect selection to display the text effect at the determined location in the warped orientation of the text element.

16. The system of claim 15, wherein the text effect includes at least one member of a group comprising: a highlight selection, an underline, and a strikethrough.

17. The system of claim 15, wherein the text effect selection relates to a cursor hit on the warped orientation.

18. The system of claim 17, wherein the text effect selection includes a cursor displayed rotated in accordance with the warped orientation.

19. The system of claim 15, wherein the text effect selection relates to a selection highlight block on the warped orientation.

20. The system of claim 19, wherein the selection highlight block is rotated in accordance with the warped orientation.

* * * * *